UNITED STATES PATENT OFFICE.

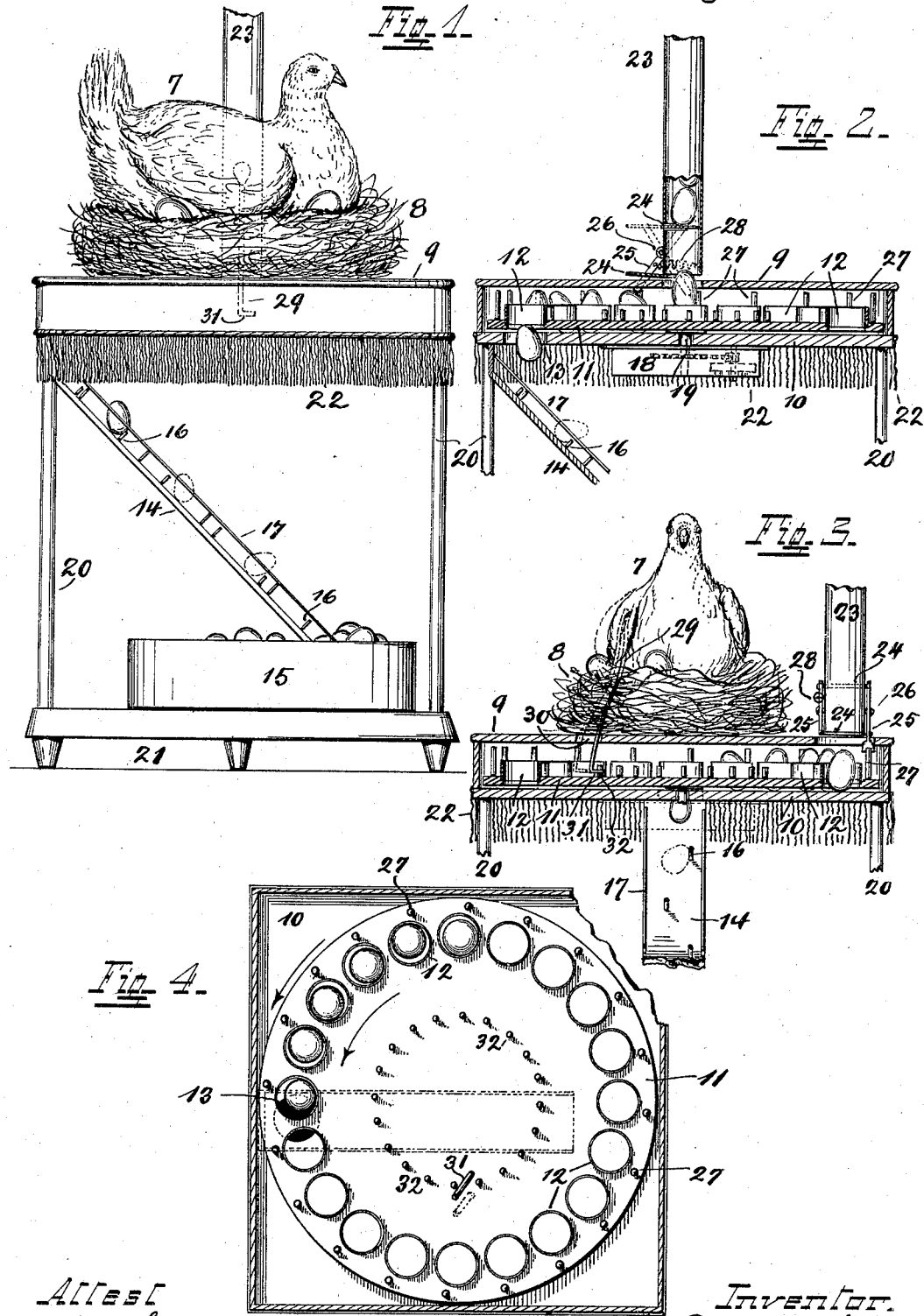

FRANK WITTE, OF CHEVIOT, OHIO.

MECHANICAL TOY.

SPECIFICATION forming part of Letters Patent No. 545,031, dated August 20, 1895.

Application filed December 8, 1894. Serial No. 531,181. (No model.)

*To all whom it may concern:*

Be it known that I, FRANK WITTE, a citizen of the United States, and a resident of Cheviot, Hamilton county, State of Ohio, have invented a new and useful Mechanical Toy; and I do declare the following to be a full, clear, and exact description of the invention, such as will enable others skilled in the art to which it appertains to make and use the same, attention being called to the accompanying drawings, with the reference-numerals marked thereon, which form a part of this specification.

This invention relates to mechanical toys which are adapted for advertising and display purposes in show-windows and stores, where they attract attention by their operation.

This toy represents, substantially, an oviparous animal, preferably a suitable bird, seated on a nest and apparently in the act of laying eggs. These latter drop at certain predetermined intervals, the whole performance transpiring in plain view, whereby, as a matter of course, it does not fail to attract attention. The eggs being naturally the objective points of observation, may bear advertisements, which thus are brought prominently to notice.

In the following specification is found a full description of my invention, its operation, parts and construction, which latter is also illustrated in the accompanying drawings, in which—

Figure 1 is an elevation of the whole toy complete. Fig. 2 is a central vertical section of the upper part thereof. Fig. 3 is a part of a similar section, also of the upper part and taken at right angles to the section shown in the preceding figure. Fig. 4 is a horizontal section and top view of the egg-carrier.

I intend to use the image of a bird, and by preference have selected the representation of a hen, as shown at 7. To make the imitation as true as possible, I prefer to use the skin of the real animal, which, with the outer feather covering and all appendages intact, is prepared taxidermally, so as to preserve its natural appearance. This figure is seated upon a nest 8, and the whole is suitably secured in position upon a platform 9. Below this latter and above another platform 10 is provided a rotating carrrier 11, having cups 12 circularly arranged and of a size suitable to carry an egg, respectively an imitation thereof, in an upright position. The object of this position is simply to economize in space, which results by reason of the smaller size required for the cups when supporting eggs in this fashion. The cups are all open below, their bottoms being formed by platform 10, which prevents the eggs from falling through, with the exception of one point at 13, where an opening is provided of sufficient size to permit passage of an egg. This opening is so located as to be centrally below and within the circular path of all the cups 12, so that they, when traveling around with the carrier, pass all in line with and over said opening. The result is that when one of the open cups passes above this opening the egg contained therein looses its vertical support and drops through the latter. It falls preferably upon an inclined chute or trough 14, on which it rolls down into a suitable receptacle 15. The down passage on this chute is retarded by stops 16 alternately arranged thereon, which prevent the eggs from rolling straight down at once, throwing them alternately from one side to the other, the eggs passing down on a zigzag line, being prevented from rolling off sidewise by open railings 17. Thus impeded the eggs are kept longer in view, giving observers ample time to notice the advertising matter on them, and it also weakens the impact with which the eggs arrive at the end of their drop, preventing injury to their outer surface.

For the purpose of bringing the open cups successively over opening 13, carrier 11 is rotated in a suitable way, preferably by a spring-motor constructed on the order of a clock-movement and contained in a housing 18. Its driving-shaft 19 reaches through platform 10 and connects to the under side of the carrier. The motor-housing is most conveniently connected to the under side of platform 10, which latter rests on legs 20 rising from a base 21. The space between platforms 9 and 10 and the discharge-opening in the latter, as well as the motor, may be hidden by drapery or fringes 22, so that all operating parts are concealed from view. The frequency with which the discharge of the eggs occurs depends, of course, on the speed with which the carrier rotates, and may be properly regulated by the motor. After emptied the cups of the carrier may be refilled by an attendant, or such filling may proceed automatically from a spout 23 of suitable height, and whereby the capacity of the device is correspondingly increased. This spout comes down behind the image and terminates above the line of cups. It is provided with two cut-offs 24, connected to each other by levers 25, pivoted at 26. Of these cut-offs one passes across the mouth of the spout, the other being up higher and passing in and out through a slot in the spout, the distance between the two being about the length of an egg, and they are so set on levers 25 that when one of them closes the spout the other leaves it open. Thus, when the lower one opens to discharge an egg into the carrier below, the upper one closes the spout to prevent any of the eggs above this lowest one from passing out with it. When the lower one closes, the upper one opens to permit the eggs above it to advance, bringing the lowest egg directly above the lower cut-off and in ready position for immediate discharge. The operation of these cut-offs proceeds from pins 27 traveling around with the carrier and coming at the proper time in contact with one of the levers 25, which for such purpose has been lengthened to reach down within the path of said pins. This engagement lasts until the lower one of the cut-offs is sufficiently open to permit an egg to pass out, after which the lengthened lever 25 is released and a spring 28 reverses again the position of the cut-offs, the lower one closing the spout.

To add to the general attractiveness of the device the figure is caused to move in imitation of flapping both or one of its wings—in the latter event the one nearest to the spectator. For such purpose a wire 29 is secured to the under side of the particular wing and extended downwardly, reaching through a slot 30 in floor 9. Its lower end is bent inwardly, and at an angle as shown at 31, which bent portion is so located as to enable pins 32 traveling with the carrier to push it out, which motion causes also the wing to move outwardly. After the particular pin has passed and cleared the lower end of the said wire the parts are carried back again to their normal positions by their own weight.

The figure 7 is not necessarily limited to the representation of a bird, and other animals may be as well imitated.

Having described my invention, I claim as new—

1. In a mechanical toy, the combination with the image 7, of a revolving carrier below adapted to receive and advance eggs and means whereby the discharge of the latter from the carrier is effected intermittently and one by one.

2. In a mechanical toy, the combination with the image 7, of a revolving carrier adapted to receive and advance eggs, a supply spout 23, to deliver eggs to the carrier, cut-off mechanism on the spout operating in a manner to supply eggs to the carrier one by one, and mechanism which causes the discharge of the latter from the carrier in the same manner.

3. In a mechanical toy, the combination with the image 7, representing substantially a bird provided with a movable wing, of a rotating carrier below, adapted to receive and advance eggs, means whereby the discharge of the latter from the carrier is effected intermittently one by one, and mechanism whereby the wing of the bird is caused to flap.

4. In a mechanical toy, the combination with the image 7, of a carrier below it, provided with cups open at their bottoms and circularly arranged, a platform 10, below the carrier, having an opening 13, in line with and below the open cups and a motor to rotate the carrier.

5. In a mechanical toy, the combination with the image 7, of a carrier below it, provided with cups open at their bottoms and circularly arranged, a platform 10, below the carrier, having an opening 13, in line with and below the open cups, a motor to rotate the carrier and an inclined chute 14, leading down from below opening 13, provided with the retarding stops 16.

6. In a mechanical toy, the combination with the image 7, of a carrier below it, provided with cups open at their bottoms and circularly arranged thereon, a motor to rotate it, a platform 10, below the carrier having an opening 13, in line with and below the open cups, a supply spout terminating above them also in line therewith, adapted to hold eggs and having a cut-off mechanism and operative connection whereby the latter is operated by the rotating carrier.

7. In a mechanical toy, the combination with the image 7, of a carrier below it, provided with cups open at their bottoms and arranged in a circular row, a motor to rotate the carrier, a supply-spout terminating above and in line with the cups, adapted to hold eggs and having a cut-off mechanism, operative connection whereby the latter is operated by the rotating carrier in a manner to supply eggs to the latter, a platform 10, below the carrier, having an opening 13, in line with and below the open cups and an inclined chute 14, leading down from and below said opening 13, and provided with the retarding stops 16.

8. In a mechanical toy, the combination of the image 7, a rotating carrier below with a circular row of cups open at their bottoms, projecting pins 27, moving around with the carrier, a supply-spout 23, terminating above the line of cups, two reciprocating cut-offs 24, for it, supported by two pivotally connected levers 25, in a manner that when one of them closes the spout, the other opens it, one of said levers reaching to within the path of pins 27, to enable them to operate the cut-offs and a floor 10, below the carrier provided with an opening 13, below and in line with the cups through which the eggs, carried by the latter and received from the supply-spout, are discharged intermittently and one by one.

9. In a mechanical toy, the combination with the image 7, representing substantially a bird provided with a movable wing, a rotating carrier below it, adapted to receive and advance eggs and having projections 32, moving with it, means whereby the eggs are discharged from the carrier intermittently and one by one, a wire 29, secured to the movable wing of the bird, the lower end of which is bent to within the path of projections 32, to enable them to act upon it for the purpose of operating the wing.

In testimony whereof I affix my signature in presence of two witnesses.

FRANK WITTE.

Witnesses:
C. FINN,
C. SPENGEL.